United States Patent
Totsuka et al.

(10) Patent No.: US 12,489,139 B2
(45) Date of Patent: Dec. 2, 2025

(54) METHOD FOR PRODUCING SOLID ELECTROLYTE

(71) Applicant: Idemitsu Kosan Co., Ltd., Tokyo (JP)

(72) Inventors: Shota Totsuka, Sodegaura (JP); Hironari Kimpara, Tokyo (JP); Masayuki Shibata, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 814 days.

(21) Appl. No.: 17/634,278

(22) PCT Filed: Sep. 17, 2020

(86) PCT No.: PCT/JP2020/035352
§ 371 (c)(1),
(2) Date: Feb. 10, 2022

(87) PCT Pub. No.: WO2021/054412
PCT Pub. Date: Mar. 25, 2021

(65) Prior Publication Data
US 2022/0336848 A1 Oct. 20, 2022

(30) Foreign Application Priority Data

Sep. 20, 2019 (JP) .................................. 2019-171494

(51) Int. Cl.
| H01M 10/0562 | (2010.01) |
| C01B 25/14 | (2006.01) |
| C30B 7/10 | (2006.01) |
| C30B 35/00 | (2006.01) |

(52) U.S. Cl.
CPC ......... *H01M 10/0562* (2013.01); *C01B 25/14* (2013.01); *C30B 7/10* (2013.01); *C30B 35/002* (2013.01); *H01M 2300/0068* (2013.01)

(58) Field of Classification Search
None
See application file for complete search history.

(56) References Cited

U.S. PATENT DOCUMENTS

| 2016/0104917 A1* | 4/2016 | Sato .................. H01M 10/0562 429/189 |
| 2017/0155170 A1* | 6/2017 | Sato ...................... C03C 10/00 |

FOREIGN PATENT DOCUMENTS

| CN | 105050976 A | 11/2015 |
| EP | 3007181 A1 | 4/2016 |
| EP | 3432320 | 1/2019 |
| JP | 2010186744 A | 8/2010 |
| JP | 2013211171 A | 10/2013 |
| JP | 2014096391 A | 5/2014 |
| JP | 2017100907 A | 6/2017 |
| JP | 2020095953 A | 6/2020 |
| WO | WO-2009047977 A1 | 4/2009 |
| WO | WO-2014192309 A1 | 12/2014 |
| WO | WO-2017159667 A1 | 9/2017 |
| WO | WO-2018164224 A1 | 9/2018 |
| WO | WO-2019031436 A1 | 2/2019 |
| WO | WO-2019098245 A1 | 5/2019 |

OTHER PUBLICATIONS

Yobuchi et al.; "An argyrodite sulfide-based superionic conductor synthesized by a liquid-phase technique with tetrahydrofuran and ethanol"; J. Mater. Chem. A, 2019, 7, pp. 558-566 (Year: 2018).*
Zhang et al.; "Sulfide-Based Solid-State Electrolytes: Synthesis, Stability and Potential for All-Solid-State Batteries"; Advanced Materials vol. 31, Issue 44; 42 pages (Year: 2019).*
Office Action issued on Nov. 29, 2022, in corresponding Japanese application No. 2021-546985, with English machine translation (8 pages total).
"Synthesis of Sulfide Solid Electrolytes by Liquid Phase Method and Formation of Interface of Bulk-type All Solid-State Batteries", J. Jpn, Soc. Colour Mater., vol. 89, No. 9, 2016, pp. 139-143.
Hans-Joerg Deiseroth et al, "Li6PS5X: A Class of Crystalline Li-Rich Solids With an Unusually High Li+ Mobility", Angew. Chem, vol. 47, No. 4, 2008, pp. 755-758.
International Search Report issued Nov. 2, 2020 in PCT/JP2020/035352 (with English translation), 5 pages.
R. P. Rao et al., "Studies of lithium argyrodite solid electrolytes for all-solid-state batteries", Phys. Status. Solidi, vol. 208, No. 8, 2011, pp. 1804-1807.
Extended European Search Report issued Sep. 21, 2023 in European Patent Application No. 20866468.0, 7 pages.
Combined Chinese Office Action and Search Report issued May 23, 2025, received on Jun. 23, 2025, in corresponding Chinese Patent Application No. 202080056934.0, (with machine English translation), 27 pages.
Office Action issued Apr. 1, 2025, received on Apr. 8, 2025, in corresponding Korean Patent Application No. 10-2022-7004582 (with English translation), 11 pages.

* cited by examiner

*Primary Examiner* — Gregg Cantelmo
(74) *Attorney, Agent, or Firm* — Element IP, PLC (57) ABSTRACT

The present invention relates to a method for producing a crystalline solid electrolyte having a small particle diameter and also having a high ionic conductivity and containing a lithium element, a sulfur element, a phosphorus element and a halogen element, the method including a complexing step of mixing a solid electrolyte raw material and a complexing agent in a liquid phase, wherein the method includes a mixing step of obtaining a precursor containing a lithium element, a sulfur element, and a phosphorus element; and a crystallization step of heating the precursor in a solvent using a pressure-resistant container or while refluxing.

20 Claims, 3 Drawing Sheets

METHOD FOR PRODUCING SOLID ELECTROLYTE

TECHNICAL FIELD

The present invention relates to a method for producing a solid electrolyte.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. But, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

Although a sulfide solid electrolyte, an oxide solid electrolyte, and so on are known as the solid electrolyte, the sulfide solid electrolyte obtained by the production method of the aforementioned PTL 1 is known as one having a relatively high ionic conductivity. Examples of a crystal structure of the sulfide solid electrolyte include an $Li_4P_2S_6$ crystal structure, an $Li_7PS_6$ crystal structure, and an $Li_7P_3S_{11}$ crystal structure, and besides, examples of a crystal structure which may have a $PS_4^{3-}$ structure include an $Li_3PS_4$ crystal structure, an $Li_{4-x}Ge_{1-x}P_xS_4$-based thio-LISICON Region II-type crystal structure, an analogous crystal structure to the $Li_{4-x}Ge_{1-x}P_xS_4$-based thio-LISICON Region II-type, and an argyrodite crystal structure.

A sulfide solid electrolyte containing an argyrodite crystal structure is known as one having a relatively high ionic conductivity, and as for the production method thereof, for example, NPL 1 and NPL 2 disclose methods in which after performing a mechanical milling reaction using a planetary ball mill, a heat treatment is performed at a high temperature as 550° C. In addition, PTL 2 discloses a method in which after mixing a lithium sulfide ($LiS_2$) powder and a sulfide powder using a ball mill or the like, the mixture is fired at 600 to 800° C. in a hydrogen sulfide gas atmosphere.

Now, as the solid electrolyte, ones having a small particle diameter have been demanded from the viewpoint of performance and production of an all-solid-state lithium battery. For example, if the particle diameter is small, in the case of fabricating an electrode using a solid electrolyte, there is an advantage such that a contact interface between an active substance and a solid electrolyte is readily formed. But, in order to obtain a sulfide solid electrolyte having an argyrodite type crystal structure that is excellent in the ionic conductivity, firing at a relatively high temperature is considered to be needed, and therefore, heating could not help being performed in a gas atmosphere in which particle growth is liable to proceed. In addition, PTL 3 and PTL 4 discloses methods in which in order to atomize the granulated solid electrolyte, pulverization treatment is performed after heating. But, in these methods, there was a case where the ionic conductivity is lowered.

Furthermore, PTL 5 discloses a method for producing a sulfide solid electrolyte by heating in a solvent in order to prevent granulation from occurring. But, in the sulfide solid electrolyte containing an argyrodite type crystal structure, the conventional technology requires the heat treatment at a high temperature as 550° C. to 800° C. during production, and therefore, heating in a solvent was difficult as a matter of convenience of the boiling point.

Accordingly, it was difficult to produce a sulfide solid electrolyte having a small particle diameter and also having a high ionic conductivity.

PTL 6 describes a production method of a sulfide-based solid electrolyte, including a step of bringing an alkali metal sulfide and a sulfur compound into contact with each other in a mixed solvent of a hydrocarbon-based solvent and a polar aprotic solvent; and PTL 7 describes a production method of a lithium ion-conductive solid electrolyte, including a step of bringing a compound, such as a phosphorus sulfide, and lithium sulfide into contact with each other in a hydrocarbon-based solvent. But, in all of the production methods, only the sulfide-based solid electrolyte of glass in the solvent is obtained, and in order to obtain a crystalline sulfide-based solid electrolyte, it is needed to go through a drying step, a heating step, and so on after the contacting step. For that reason, it was difficult to readily produce a sulfide solid electrolyte having a small particle diameter and also having a high ionic conductivity.

PTL 8 describes a production method of a solid electrolyte having an argyrodite type crystal structure, including subjecting a raw material mixture containing lithium, sulfur, phosphorus, and a halogen to a heat treatment in a solvent using a pressure-resistant container or while refluxing, removing the aforementioned solvent, and firing a treated material obtained by the aforementioned heat treatment. According to the method described in PTL 7, the crystalline solid electrolyte is not obtained in a solvent similar to PTL 6, and firing of the treated material is needed, and thus, it was difficult to readily produce a sulfide solid electrolyte having a small particle diameter and also having a high ionic conductivity.

Furthermore, NPL 3 describes that by dissolving $Li_2S$, LiBr, and $Li_3PS_4$ in an ethanol solvent and reacting them in the solvent, to synthesize an $Li_6PS_5Br$ crystal as the argyrodite type crystal. According to this method, the raw materials, such as $Li_2S$, LiBr, and $Li_3PS_4$, are dissolved in the ethanol solvent, so that the reaction of these raw materials is corresponding to a homogeneous method among liquid-phase methods. But, in the homogenous method, deposition proceeds according to an inherent solubility of each of the components, each of the components is separated and deposited, and an affinity between Li and the solvent becomes excessively strong, and therefore, even by drying after deposition, the solvent hardly comes out. For these matters, there was a case where the ionic conductivity of the solid electrolyte is largely lowered.

CITATION LIST

Patent Literature

PTL 1: WO 2017/159667 A
PTL 2: JP 2013-211171 A
PTL 3: WO 2018/164224 A
PTL 4: WO 2019/031436 A
PTL 5: JO 2014-096391 A
PTL 6: WO 2014/192309 A
PTL 7: WO 2009/047977 A
PTL 8: JP 2020-95953 A

Non-Patent Literature

NPL 1: Angew. Chem, Vol. 47 (2008), No. 4, pp. 755-758
NPL 2: Phys. Status. Solidi, Vol. 208 (2011), No. 8, pp. 1804-1807
NPL 3: J. Jpn, Soc. Colour Mater., Vol. 89, No. 9 (2016), pp. 139-143

SUMMARY OF INVENTION

Technical Problem

In view of the aforementioned circumstances, the present invention has been made, and an object thereof is to provide a method for producing a solid electrolyte having a small particle diameter and also having a high ionic conductivity.

Solution to Problem

In order to solve the aforementioned problem, the present inventors made extensive and intensive investigations. As a result, it has been found that the foregoing problem can be solved by the following invention.
1. A method for producing a crystalline solid electrolyte containing a lithium element, a sulfur element, a phosphorus element, and a halogen element, including a complexing step of mixing a solid electrolyte raw material and a complexing agent in a liquid phase, wherein the method includes a mixing step of obtaining a precursor containing a lithium element, a sulfur element, and a phosphorus element; and a crystallization step of heating the precursor in a solvent using a pressure-resistant container or while refluxing.

Advantageous Effects of Invention

In accordance with the present invention, it is possible to provide a production method of a solid electrolyte having a small particle diameter and also having a high ionic conductivity.

DESCRIPTION OF EMBODIMENTS

Embodiments of the present invention (hereinafter sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

The production method of a crystalline solid electrolyte of the present embodiment is a production method of a crystalline solid electrolyte containing a lithium element, a sulfur element, a phosphorus element, and a halogen element, including a complexing step of mixing a solid electrolyte raw material and a complexing agent in a liquid phase, wherein the method includes a mixing step of obtaining a precursor containing a lithium element, a sulfur element, and a phosphorus element; and a heating step of heating the precursor in a solvent using a pressure-resistant container or while refluxing (the heating step may also be referred to as "crystallization step", as mentioned later).

The "solid electrolyte" as referred to in this specification means an electrolyte of keeping the solid state at 25° C. in a nitrogen atmosphere. The solid electrolyte obtained by the production method of the present embodiment is one having an ionic conductivity, which contains at least a sulfur element and a phosphorus element and may also contain a lithium element as an element capable of exhibiting an ionic conductivity.

Although the "solid electrolyte" is roughly classified into an amorphous solid electrolyte and a crystalline solid electrolyte, the solid electrolyte obtained by the invention of the present application is a crystalline solid electrolyte. Here, whether or not the solid electrolyte is a crystalline solid electrolyte can be judged by measurement results of X-ray diffractometry, $^{31}$P-NMR, or the like. For example, in the X-ray diffractometry, in the case where peaks derived from a solid electrolyte is observed in the X-ray diffraction pattern, in particular, in the case where a crystal structure is an argyrodite type crystal structure, such as $Li_6PS_5X$ and $Li_{7-x}PS_{6-x}X_x$ (X=Cl, Br, or I, and x=0.0 to 1.8), that solid electrolyte may be said to be a crystalline solid electrolyte. Diffraction peaks of such an argyrodite-based crystal structure appear, for example, in the vicinity of 2θ=15.3°, 17.7°, 31.1°, 44.9°, and 47.7°. Besides, even in the case where a degree of crystallization measured by $^{31}$P-NMR is 80% or more, that solid electrolyte may be said to be a crystalline solid electrolyte. Specifically, the degree of crystallization is a numerical value measured in a manner that a solid $^{31}$P-NMR spectrum is measured, with respect to the obtained spectrum, a resonance line observed at 70 to 120 ppm is separated into Gaussian curves using the nonlinear least squares method, and an area ratio of the respective curves is determined.

[Mixing Step]

The production method of a crystalline solid electrolyte of the present embodiment includes a mixing step of obtaining a precursor containing a lithium element, a sulfur element, and a phosphorus element, and the present mixing step includes a complexing step of mixing a solid electrolyte raw material and a complexing agent in a liquid phase. The precursor containing a lithium element, a sulfur element, and a phosphorus element obtained in the present mixing step is provided for the sequent heating step (crystallization step).

(Solid Electrolyte Raw Material)

As the solid electrolyte raw material which is used in the present embodiment, from the viewpoint of obtaining a crystalline solid electrolyte containing a lithium element, a sulfur element, a phosphorus element, and a halogen element, a raw material containing one element selected from a lithium element, a sulfur element, a phosphorus element, and a halogen element is preferably used, and it may be a material containing a lithium element, a sulfur element, a phosphorus element, and a halogen element by using one or a combination of plural raw materials.

Examples of such a raw material include lithium sulfide ($Li_2S$); and a phosphorus sulfide, such as diphosphorus trisulfide ($P_2S_3$) and diphosphorus pentasulfide ($P_2S_5$).

The lithium sulfide is preferably in a particle state.

An average particle diameter ($D_{50}$) of the lithium sulfide particle is preferably 0.1 μm or more and 300 μm or less, more preferably 1 μm or more and 100 μm or less, still more preferably 3 μm or more and 50 μm or less, and especially preferably 5 μm or more and 30 μm or less. In this specification, the average particle diameter ($D_{50}$) is a particle diameter to reach 50% of all the particles in sequential cumulation from the smallest particles in drawing the particle diameter distribution cumulative curve, and the volume distribution is concerned with an average particle diameter which can be, for example, measured with a laser diffraction/scattering particle diameter distribution measuring device. In addition, with respect to other solid raw materials which are used in the present embodiment, the solid raw material is preferably one having an average particle diameter of the same degree as in the aforementioned lithium sulfide particle, namely one having an average particle diameter falling within the same range as in the aforementioned lithium sulfide particle is preferred.

As the solid electrolyte raw material, a halogen element-containing raw material is preferably used from the viewpoint of improving the ionic conductivity.

Representative examples of the halogen element-containing raw material include raw materials composed of at least two elements selected from the following four elements, namely, a lithium element, a phosphorus element, and a sulfur element, and a preferably used halogen element, such as lithium halides, e.g., lithium fluoride, lithium chloride, lithium bromide, and lithium iodide; phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PI_3$ and $P_2I_4$); and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), as well as halogen simple substances, such as fluorine ($F_2$), chlorine ($Cl_2$), bromine ($Br_2$), and iodine ($I_2$), with chlorine ($Cl_2$), bromine ($Br_2$), and iodine ($I_2$) being preferred.

As materials which may be used as the raw material other than those mentioned above, for example, a compound containing not only at least one element selected from the aforementioned lithium element, phosphorus element, and sulfur element but also other element than the foregoing three elements can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate; halides of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halide, an antimony halide, a tellurium halide, and a bismuth halide; and phosphorus oxyhalides, such as phosphorus oxychloride ($POCl_3$) and phosphorus oxybromide ($POBr_3$).

In the present embodiment, the precursor containing a lithium element, a sulfur element, and a phosphorus element, which is obtained in the present mixing step, is preferably a precursor containing a $PS_4^{3-}$ structure from the viewpoint of improving the ionic conductivity. Although details will be mentioned later, examples of the precursor containing a $PS_4^{3-}$ structure include $PS_4^{3-}$ structures, such as amorphous $Li_3PS_4$, crystalline $Li_3PS_4$, and a complex from which amorphous $Li_3PS_4$ and crystalline $Li_3PS_4$ are obtainable through decomplexation. In addition, besides these $PS_4^{3-}$ structures, the foregoing precursor is a mixture which may contain an unreacted solid electrolyte raw material (raw material mainly containing a halogen element) or a halogen element-containing raw material to be blended after a later-mentioned complexing step. Accordingly, in this specification, the precursor containing a $PS_4^{3-}$ structure will be referred to as "$PS_4^{3-}$ structure, etc.".

In this case, among those mentioned above, lithium sulfide ($Li_2S$) and a phosphorus sulfide, such as diphosphorus trisulfide ($P_2S_3$) and diphosphorus pentasulfide ($P_2S_5$), are preferably used as the raw material.

In this case, a blending ratio of the lithium sulfide and the phosphorus sulfide is not particularly restricted so long as it falls within a range of ratio at which the $PS_4^{3-}$ structure may be formed. From the viewpoint that the $PS_4^{3-}$ structure is efficiently formed, in the case of using diphosphorus pentasulfide as the phosphorus sulfide, a proportion of a molar number of the lithium sulfide relative to a total molar number of lithium sulfide and diphosphorus pentasulfide is preferably within a range of 60 to 90%, more preferably within a range of 65 to 85%, still more preferably within a range of 70 to 80%, yet still more preferably within a range of 72 to 78%, and especially preferably within a range of 73 to 77%.

In the present embodiment, from the viewpoint of easiness of formation of the $PS_4^{3-}$ structure, improvement of the ionic conductivity, and so on, it is preferred to use a halogen element-containing raw material in addition to the aforementioned lithium sulfide ($Li_2S$), diphosphorus trisulfide ($P_2S_3$), and diphosphorus pentasulfide ($P_2S_5$). In the case of using a halogen element-containing raw material, in the present mixing step, in addition to the aforementioned raw material containing a lithium element, a phosphorus element, and a sulfur element, such as lithium sulfide and a phosphorus sulfide, among the aforementioned halogen element-containing raw materials, a lithium halide, such as lithium fluoride, lithium chloride, lithium bromide, and lithium iodide, and a halogen simple substance, such as fluorine ($F_2$), chlorine ($Cl_2$), bromine ($Br_2$), and iodine ($I_2$), are preferred; among the lithium halides, lithium chloride, lithium bromide, and lithium iodide are preferred, and lithium chloride and lithium bromide are more preferred; and among the halogen simple substances, chlorine ($Cl_2$), bromine ($Br_2$), and iodine ($I_2$) are preferred, and chlorine ($Cl_2$) and bromine ($Br_2$) are more preferred.

In the case of using a halogen element-containing raw material, as the combination of raw materials, for example, a combination of lithium sulfide, diphosphorus pentasulfide, and a lithium halide, a combination of lithium sulfide, diphosphorus pentasulfide, and a halogen simple substance, and a combination of lithium sulfide, diphosphorus pentasulfide, a lithium halide, and a halogen simple substance are preferred; a combination of lithium sulfide, diphosphorus pentasulfide, and a lithium halide, and a combination of lithium sulfide, diphosphorus pentasulfide, and a halogen simple substance are more preferred; and a combination of lithium sulfide, diphosphorus pentasulfide, and a lithium halide is still more preferred.

In this case, as the lithium halide, lithium chloride, lithium bromide, and lithium iodide are preferred, and lithium chloride and lithium bromide are more preferred; and as the halogen simple substance, a chlorine, bromide, and iodine are preferred, and chlorine and bromine are more preferred.

In the case of using a halogen element-containing raw material, the halogen element-containing raw material may be blended in the present mixing step, and as a matter of course, it may be blended collectively together with lithium sulfide, diphosphorus pentasulfide, and the like from the first, or it may be blended after a later-mentioned complexing step. In that case, the halogen element-containing raw material can be, for example, formed by blended after synthesizing a $PS_4^{3-}$ structure using lithium sulfide and phosphorus sulfide in the present mixing step.

In the case of using a halogen element-containing raw material, a blending ratio of the foregoing raw materials is mentioned later.

(Complexing Step)

In the mixing step, a complexing step of mixing the aforementioned solid electrolyte raw material and a complexing agent in a liquid phase is included. The mixing step in the present embodiment is a step which may have, in addition to the present complexing step of mixing an electrolyte raw material and a complexing agent, a drying step, a step of heating different from the heating step (crystallization step), and a pulverization step, and the like as mentioned later. In addition, the complexing agent as referred to in this specification is a substance capable of forming a complex together with the lithium element and means one having such properties of acting with the lithium element-containing sulfide contained in the aforementioned solid electrolyte raw material, thereby promoting formation of the precursor containing a lithium element, a sulfur element, and a phosphorus element, preferably the $PS_4^{3-}$ structure. The aforementioned complex obtained through formation of a complex together with the lithium element is a complex containing a lithium element, a sulfur element, a phosphorus element, and the aforementioned complexing agent, and preferably a complex from which amorphous $Li_3PS_4$ and crystalline $Li_3PS_4$ are obtainable through the aforementioned decomplexation, and is one from which among the $PS_4^{3-}$ structures, amorphous $Li_3PS_4$ and crystalline $Li_3PS_4$ are obtained through removal of the complexing agent from the foregoing complex (referred to simply as "decomplexation").

As the complexing agent, any compound can be used without particular restrictions so long as it has the aforementioned properties, and in particular, a compound having a high affinity with the lithium element, for example, a compound containing a hetero element, such as a nitrogen element, an oxygen element, and a chlorine element, is preferred, and a compound having a group containing such a hetero element is more preferred. This is because such a hetero element and the foregoing group containing a hetero element may be coordinated (bound) with lithium.

As the hetero element, there are preferably exemplified a nitrogen element, an oxygen element, and a halogen element, such as a chlorine element, and a compound containing such an element is preferably exemplified as the complexing agent.

Specifically, examples of the complexing agent include ester-based solvents, such as ethyl acetate and butyl acetate; aldehyde-based solvents, such as formaldehyde, acetaldehyde, and dimethylformamide; ketone-based solvents, such as acetone and methyl ethyl ketone; ether-based solvents, such as diethyl ether, diisopropyl ether, dibutyl ether, tetrahydrofuran, dimethoxyethane, cyclopentyl methyl ether, tert-butyl methyl ether, and anisole; halogen element-containing aromatic hydrocarbon solvents, such as trifluoromethylbenzene, nitrobenzene, chlorobenzene, chlorotoluene, and bromobenzene; amine-based solvents, such as tetramethylethylenediamine, tetraethylethylenediamine, tetramethyldiaminopropane, tetraethyldiaminopropane, cyclopropanediamine, tolylenediamine, and tetraethylenepentamine; nitrile-based solvents, such as acetonitrile, methoxyacetonitrile, propionitrile, methoxypropionitrile, and benzonitrile; and solvents containing a carbon atom and a hetero atom, such as dimethyl sulfoxide and carbon disulfide.

Of these, as the complexing agent, amine-based solvents, ether-based solvents, and nitrile-based solvents are preferred; ether-based solvents are more preferred. Above all, diethyl ether, diisopropyl ether, dibutyl ether, and tetrahydrofuran are preferred, and tetrahydrofuran is more preferred. In addition, the complexing agent is preferably one having such properties that the solid electrolyte raw material is not dissolved or hardly dissolved therein, and from such viewpoint, an amine-based solvent and an ether-based solvent are preferred. When such a solvent is adopted, the foregoing raw material reacts by a heterogeneous method among the liquid phase methods, whereby the precursor is obtained, and the foregoing precursor is readily obtained as a simple substance, and the ionic conductivity is improved.

In addition to the aforementioned complexing agent, various solvents, such as aliphatic hydrocarbon solvents, e.g., hexane, pentane, 2-ethylhexane, heptane, octane, decane, undecane, dodecane, and tridecane; alicyclic hydrocarbon solvents, e.g., cyclohexane and methylcyclohexane; aromatic hydrocarbons, e.g., benzene, toluene, xylene, mesitylene, ethylbenzene, and tert-butylbenzene; and paraffin-based solvents, e.g., normal paraffin-based solvents that is an oligomer resulting from polymerizing at least one of normal paraffins, e.g., normal butene and normal propylene, at a degree of polymerization of about 3 to 10, and a hydrogenated material thereof, and isoparaffin-based solvents that are an oligomer resulting from polymerizing at least one of at least isoparaffin among paraffins, e.g., isobutene, normal butene, normal propylene, and isopropylene, at a degree of polymerization of about 3 to 10, and a hydrogenated material thereof, can be used.

In the case of mixing the solid electrolyte raw material and the complexing agent in a liquid phase, the use amount of the complexing agent relative to the solid electrolyte raw material is preferably 1 to 50% by mass, more preferably 2 to 30% by mass, still more preferably 3 to 20% by mass, and yet still more preferably 5 to 15% by mass in terms of the content of the solid electrolyte raw material in a liquid phase.

The precursor containing a lithium element, a sulfur element, and a phosphorus element, preferably a $PS_4^{3-}$ structure-containing precursor ($PS_4^{3-}$ structure, etc.) can be synthesized by mixing the aforementioned solid electrolyte raw material and complexing agent, and it can be, for example, synthesized through pulverization, kneading, or a combined treatment of these, in addition to mixing. The treatments, such as mixing, pulverization, and kneading, are phenomena which may occur simultaneously with each other, and therefore, there is a case where they cannot be definitely distinguished from each other. This is because when solid-state or powder-state raw materials exemplified as the raw materials which may be contained in the aforementioned solid electrolyte raw material are mixed, kneading occasionally occurs; the solid electrolyte raw materials occasionally collide and pulverize each other at the same time or may be kneaded; or the pulverization itself also serves mixing or kneading. It may be said that the synthesis of the precursor in the present mixing step is achieved through repetition of contact of the raw materials with each other by imparting a force, such as rotation and vibration, to the various raw materials contained in the solid electrolyte raw material. The foregoing contact may include at least a treatment by mixing, and it may be performed accompanied with other treatment, namely any treatment of pulverization, kneading, or the like. The aforementioned treatment in the complexing step is a treatment in the complexing step to be performed as one mode of mixing for the purpose of obtaining the precursor containing a $PS_4^{3-}$ structure, such as the complex containing a lithium element, a sulfur element, a phosphorus element, and the aforementioned complexing agent and is different from the pulverization step of pulverizing the precursor obtained in the later-mentioned complexing step.

In the present embodiment, mixing, pulverization, kneading, or a combined treatment thereof can be, for example, achieved by a mechanical agitation type mixer having an impeller provided within a tank.

Examples of the mechanical agitation type mixer include a high-speed agitation type mixer and a double arm type mixer, and a high-speed agitation type mixer is preferably used from the viewpoint of promoting the reaction due to more homogenous contact among the various raw materials contained in the raw material inclusion with each other, to obtain a higher ionic conductivity. In addition, examples of the high-speed agitation type mixer include a vertical axis rotating type mixer and a lateral axis rotating type mixer, and mixers of any of these types may be used.

Examples of a shape of the impeller which is used in the mechanical agitation type mixer include a blade type, an arm type, a ribbon type, a multistage blade type, a double arm type, a shovel type, a twin-shaft blade type, a flat blade type, and a C type blade type. From the viewpoint of promoting the reaction due to more homogenous contact among the various raw materials contained in the raw material inclusion with each other, to obtain a higher ionic conductivity, a shovel type, a flat blade type, a C type blade type, and the like are preferred.

The aforementioned treatment can also be, for example, performed using a medium type pulverizer.

The medium type pulverizer is roughly classified into a vessel driving type pulverizer and a medium agitation type pulverizer. Examples of the vessel driving type pulverizer include an agitation tank, a pulverization tank, and a combination thereof, such as a ball mill and a bead mill. As the ball mill and the bead mill, any of various types, such as a rotary type, a rolling type, a vibration type, and a planetary type, can be adopted.

Examples of the medium agitation type pulverizer include various pulverizers, such as impact type pulverizers, e.g., a cutter mill, a hammer mill, and a pin mill; tower type pulverizers, such as a tower mill; agitation tank type pulverizers, such as an attritor, an aquamizer, and a sand grinder; flow tank type pulverizers, such as a visco mill and a pearl mill; flow tube type pulverizers; annular type mills, such as a co-ball mill; and continuous dynamic type pulverizers.

The pulverization can also be, for example, performed using a single-screw or multi-screw kneader or the like.

In the complexing step, it is preferred to adopt a treatment using a mechanical agitation type mixer from the viewpoint of more efficiently synthesizing a $PS_4^{3-}$ structure-containing precursor ($PS_4^{3-}$ structure, etc.), especially a complex containing a lithium element, a sulfur element, a phosphorus element, and the aforementioned complexing agent, preferably a complex from which amorphous $Li_3PS_4$ and crystalline $Li_3PS_4$ are obtainable through the aforementioned decomplexation. Such is also preferred from the standpoint of production efficiency. On the other hand, from the same viewpoint, it is preferred that in the complexing step, a generally called pulverizer, such as medium type pulverizers, e.g., a ball mill and a bead mill, and medium agitation type pulverizers, a kneader, and the like are not used as far as possible.

Although a temperature during synthesizing the aforementioned precursor in the complexing step is not particularly restricted, for example, it can be adjusted within a range of 20 to 100° C. Although about room temperature (23° C.) may be adopted, in order to make the synthesis reaction proceed for a short time, heating may be performed, and a high temperature is preferred so long as the condition is one under which drying, such as refluxing, does not occur. For example, the temperature can be set to 50 to 90° C., and more preferably about 80° C.

A synthesis time may be set to about 0.5 to 100 hours, and taking into consideration the production efficiency, it is preferably 1 to 90 hours, and more preferably 3 to 75 hours.

The material obtained through the aforementioned synthesis may be said to be a precursor containing a lithium element, a sulfur element, and a phosphorus element, namely a complex containing a lithium element, a sulfur element, a phosphorus element, and the aforementioned complexing agent, and preferably a precursor from which amorphous $Li_3PS_4$ and crystalline $Li_3PS_4$ are obtainable through the aforementioned decomplexation.

(Drying Step)

In the mixing step, in order to remove the aforementioned complexing agent and solvent, the production method of the present embodiment may include a step of drying (also referred to simply as "drying step"). In the mixing step, in the case where the slurry containing the complex from which amorphous $Li_3PS_4$ and crystalline $Li_3PS_4$ are obtainable as mentioned previously has been obtained, by performing drying in the drying step to remove the complexing agent and the solvent from the slurry, whereby a complex crystal can be obtained.

By removing the complexing agent and the solvent, the amount of impurities is reduced, so that the ionic conductivity can be expected to be improved. On the other hand, in the case of performing the aforementioned complexing step in a liquid phase, though the resultant becomes a slurry containing the precursor, there is a case where when such a slurry is dried, an aggregate is liable to be formed. In addition, when the foregoing aggregate is provided for heating which is optionally adopted as mentioned later, since a larger fired body is formed, there is a case where a solid electrolyte having a small particle diameter is not obtained. In such case, it is preferred that the later-mentioned pulverization is performed, or in the case of including a later-mentioned step of heating, a step of drying is not included in the mixing step from the viewpoint of production efficiency of the solid electrolyte.

Accordingly, necessity of the drying step may be determined taking into consideration the desired solid electrolyte, the raw materials to be used, and so on because there is a merit or a demerit.

The drying can be performed for the precursor accompanied with the complexing agent and the solvent at a temperature according to the kinds of the remaining complexing agent and solvent, and for example, it can be performed at a temperature of the boiling points of the remaining complexing agent and solvent or higher. For example, the drying temperature may be typically set to 5 to 100° C., preferably 10 to 90° C., and more preferably 20 to 85° C. In addition, the drying can also be performed through drying under reduced pressure (vacuum drying) using a vacuum pump or the like.

Although a drying time is not particularly restricted, for example, it is preferably 1 minute or more, more preferably 10 minutes or more, still more preferably 30 minutes or more, and yet still more preferably 1 hour or more. In addition, though an upper limit of the drying time is not particularly restricted, it is preferably 24 hours or less, more preferably 12 hours or less, still more preferably 6 hours or less, and yet still more preferably 3 hours or less.

The drying may be performed by subjecting the precursor accompanied with the complexing agent and the solvent to solid-liquid separation by means of filtration with a glass filter or the like, or decantation, or solid-liquid separation with a centrifuge or the like. In the present embodiment, after performing the solid-liquid separation, the drying may be performed under the aforementioned temperature condition.

Specifically, for the solid-liquid separation, decantation in which the precursor accompanied with the complexing agent and the solvent is transferred into a container, and after the precursor is precipitated, the solvent as a supernatant is removed, or filtration with a glass filter having a pore size of, for example, about 10 to 200 μm, and preferably 20 to 150 μm, is easy.

(Heating)

Separately from the later-mentioned heating step (crystallization step), in the mixing step, the precursor obtained through the aforementioned mixing may be heated. For example, heating is effective for making a precursor containing amorphous or crystalline $Li_3PS_4$ as the $PS_4^{3-}$ structure. For example, the amorphous $Li_3PS_4$ can be obtained by after the aforementioned complexing step and drying step, removing the complexing agent and the solvent from the slurry containing the complex from which amorphous $Li_3PS_4$ and crystalline $Li_3PS_4$ are obtainable, to obtain a complex crystal and heating the foregoing complex crystal to remove (decomplex) the complexing agent; and the crystalline $Li_3PS_4$ can also be obtained by after obtaining the complex crystal or amorphous $Li_3PS_4$, further performing heating while adjusting the heating temperature. In this way, in the production method of the present embodiment, in the heating in the mixing step (not the later-mentioned heating step (crystallization step)), a decomplexing step of removing the complexing agent from the complex crystal to obtain amorphous $Li_3PS_4$ and a step of heating the complex crystal or amorphous $Li_3PS_4$ to obtain crystalline $Li_3PS_4$ may be included. That is, in the production method of the present embodiment, the mixing step may preferably include the decomplexing step and the step of obtaining crystalline $Li_3PS_4$ as the step of heating.

In general, when a solid electrolyte is heated, there is a case where prospering after a fire in which the particle diameter becomes large occurs. In the present embodiment, by forming the aforementioned precursor ($PS_4^{3-}$ structure, etc.) prior to the later-mentioned pulverization step, the particle diameter of the resulting solid electrolyte can be made smaller, and therefore, it becomes possible to not only make the particle diameter small but also simultaneously contemplate to improve the ionic conductivity.

Although a treatment temperature of heating in the mixing step is not particularly restricted so long as the $PS_4^{3-}$ structure-containing precursor ($PS_4^{3-}$ structure, etc.) is obtained, for example, it is preferably 140° C. or higher, more preferably 145° C. or higher, still more preferably 150° C. or higher, and yet still more preferably 170° C. or higher, and though an upper limit thereof is not particularly restricted, it is preferably 300° C. or lower, more preferably 275° C. or lower, still more preferably 225° C. or lower, and yet still more preferably 200° C. or lower. When the treatment temperature falls within the aforementioned temperature range, the $PS_4^{3-}$ structure-containing precursor ($PS_4^{3-}$ structure, etc.) can be more efficiently produced, and crystalline $Li_3PS_4$ can be mainly obtained.

In the case of mainly obtaining amorphous $Li_3PS_4$, an upper limit of the treatment temperature of heating may be set to 150° C. or lower, preferably 140° C. or lower, more preferably 135° C. or lower, and though a lower limit thereof is not particularly restricted, it may be about 100° C. or higher, and preferably 105° C. or higher.

Although a treatment time of heating in the mixing step is not particularly restricted so long as the $PS_4^{3-}$ structure-containing precursor ($PS_4^{3-}$ structure, etc.) is obtained, for example, it is preferably 10 minutes or more, more preferably 30 minutes or more, still more preferably 1 hour or more, and yet still more preferably 4 hours or more. In addition, though an upper limit of the heating time is not particularly restricted, it is preferably 24 hours or less, more preferably 18 hours or less, still more preferably 12 hours or less, and yet still more preferably 10 hours or less.

The heating in the mixing step may be performed in an inert gas atmosphere (for example, a nitrogen atmosphere and an argon atmosphere) or in a reduced pressure atmosphere (especially, in vacuo). This is because deterioration (for example, oxidation) of the precursor obtained through the aforementioned synthesis and mixing can be prevented from occurring.

Although the method of heating is not particularly limited, for example, a method of using a hot plate, an autoclave, a vacuum heating device, an argon gas atmosphere furnace, or a firing furnace can be exemplified. In addition, industrially, a lateral dryer or a lateral vibration fluid dryer provided with a heating means and a feed mechanism, or the like can also be used, and it may be selected according to the treatment amount of heating As mentioned above, the $PS_4^{3-}$ structure-containing precursor ($PS_4^{3-}$ structure, etc.) obtained through any of the complexing step, the drying step, and the heating step (which may include the decomplexing step and the step of obtaining crystalline $Li_3PS_4$) is specifically one containing a $PS_4^{3-}$ structure-containing structure ($PS_4^{3-}$ structure), and representatively, examples of the $PS_4^{3-}$ structure include a complex from which the aforementioned amorphous $Li_3PS_4$ and crystalline $Li_3PS_4$ are obtainable through decomplexation, amorphous $Li_3PS_4$, and crystalline $Li_3PS_4$ ($\beta$-$Li_3PS_4$). In addition, as for the $PS_4^{3-}$ structure-containing precursor, there is a case where a single kind of these $PS_4^{3-}$ structures is contained, or there is a case where plural kinds of these $PS_4^{3-}$ structures are coexistent.

In the present embodiment, by once forming a $PS_4^{3-}$ structure and then providing the foregoing structure for the sequent step, a solid electrolyte having a small particle diameter and also having a high ionic conductivity is obtained.

The complex from which the aforementioned amorphous $Li_3PS_4$ and crystalline $Li_3PS_4$ are obtainable through decomplexation is obtained as a slurry accompanied with the complexing agent, the solvent, and the like, and the drying is performed to remove the complexing agent, the solvent, and the like from the foregoing slurry, thereby obtaining a complex crystal. When this complex crystal is subjected to heating (not heating in the heating step (crystallization step)), the complexing agent is removed (decomplexed) from the complex crystal, thereby obtaining amorphous $Li_3PS_4$. In addition, in this heating, crystalline $Li_3PS_4$ may be obtained directly or through amorphous $Li_3PS_4$ from the complex crystal. In the production method of the present embodiment, by finally crystallizing the aforementioned $PS_4^{3-}$ structure containing precursor ($PS_4^{3-}$ structure, etc.) through the later-mentioned heating step (crystallization step), a crystalline solid electrolyte containing a lithium element, a sulfur element, a phosphorus element, and a halogen element is obtained.

Accordingly, it is preferred that the production method of the present embodiment includes, after the aforementioned complexing step, at least one step of a drying step of obtaining a complex crystal, a decomplexing step of removing the complexing agent contained in the aforementioned complex crystal to obtain the aforementioned amorphous $Li_3PS_4$, and a step of heating at least one of the aforementioned complex crystal and amorphous $Li_3PS_4$ to obtain crystalline $Li_3PS_4$.

The $PS_4$ structure contained in the precursor can be observed through the solid $^{31}P$-NMR spectrometry.

The $PS_4^{3-}$ structure-containing precursor which is preferably obtained in the present mixing step is one in which a peak assigned to the $PS_4^{3-}$ structure appears. From the viewpoint of ionic conductivity, it is preferred that the crystal structure constituted of a phosphorus element and a sulfur element does not contain other structure than the $PS_4^{3-}$ structure, for example, crystal structures, such as a $P_2S_7^{4-}$ structure and a $P_2S_6^{4-}$ structure ($P_xS_y^{a-}$ structure). In accordance with the aforementioned synthesis method, a precursor containing such a $PS_4^{3-}$ structure is readily obtained.

It is preferred that the precursor obtained in the present mixing step is provided for each step of the later-mentioned pulverization step and heating step (crystallization step) after previously forming a main skeleton which is considered to have the $PS_4^{3-}$ structure. This is because the increase of the particle diameter is suppressed, and a solid electrolyte having a small particle diameter is readily obtained.

In the production method of the present embodiment, a main skeleton which is considered to have a $PS_4^{3-}$ structure is previously formed into the $PS_4^{3-}$ structure-containing precursor ($PS_4^{3-}$ structure, etc.), and in the crystallization step of heating this in a solvent, the reaction of the $PS_4^{3-}$ structure contained in the foregoing precursor and a halogen element-containing raw material and the like is made to proceed together with the crystallization, whereby a crystalline solid electrolyte containing a lithium element, a sulfur element, a phosphorus element, and a halogen element is obtained.

(Blending of Halogen Element-Containing Raw Material)

As mentioned previously, in the present embodiment, a halogen element-containing raw material can be used. In this case, the halogen element-containing raw material can be blended in the complexing step in the mixing step or after the complexing step. The blending after the complexing step means blending after obtaining the precursor obtained in the complexing step, namely the already-mentioned $PS_4^{3-}$ structure-containing precursor, and specifically, blending after the complexing step and before the pulverization step, or in the pulverization step. In the case of blending the halogen element-containing raw material in the complexing step, in the foregoing complexing step, the precursor that is a mixture of the $PS_4^{3-}$ structure and the halogen element-containing raw material is obtained. In addition, in the case of blending the halogen element-containing raw material after the foregoing complexing step, namely after synthesizing the $PS_4^{3-}$ structure, the foregoing halogen element-containing raw material is blended and mixed in the same manner as in the aforementioned complexing step, or pulverization is performed through the pulverization step, the precursor that is a mixture containing the $PS_4^{3-}$ structure, the halogen element-containing raw material and the like is obtained.

In the production method of the present embodiment, the halogen element-containing raw material may be added together with other solid electrolyte raw material and subjected to the aforementioned complexing step or the like, or may be added after the complexing step. However, from the viewpoint of more surely forming the $PS_4^{3-}$ structure, contemplating to improve the ionic conductivity, and more surely making the particle diameter small, it is preferred to blend the halogen element-containing raw material after the complexing step, and it is more preferred to blend the halogen element-containing raw material after the complexing step and before the pulverization step.

Similar to the halogen element-containing raw material, a lithium sulfide-containing raw material may be further blended in the pulverization step or before the pulverization step. Although the lithium sulfide is a raw material which is preferably used in the aforementioned complexing step, there is a case where for example, the required amount of lithium sulfide desired in the production of the $PS_4^{3-}$ structure-containing precursor which is obtained in the pulverization step differs from the required amount of lithium sulfide desired in the crystalline solid electrolyte which is obtained in the production method of the present embodiment. In the case of compensating the short amount in the lithium sulfide used in the aforementioned complexing step relative to the required amount for producing the desired crystalline solid electrolyte, it is effective to blend the lithium sulfide-containing raw material.

The halogen element-containing raw material and the lithium sulfide-containing raw material as blended in this pulverization step are pulverized and dispersed together with the precursor obtained in the aforementioned complexing step, thereby forming the precursor.

Accordingly, in the present embodiment, at the point of time after the pulverization step and before the crystallization step, the blending ratio of the various elements contained in the desired crystalline solid electrolyte may be set.

The blending ratio of the various raw materials used for the solid electrolyte raw material in the present embodiment may be appropriately determined according to the desired crystal structure. As an example thereof, the blending ratio of the various raw materials in the crystalline solid electrolyte having an argyrodite type crystal structure, which is one of the preferred crystalline solid electrolytes obtained by the production method of the present embodiment, is hereunder described. The crystalline solid electrolyte having an argyrodite type crystal structure is described later.

For example, in the case of blending crystalline $Li_3PS_4$ ($\beta$-$Li_3PS_4$) which is representatively obtained in the complexing step, lithium sulfide, and a lithium halide, a molar ratio of these raw materials {$Li_3PS_4$/$Li_2S$/(lithium halide)} is preferably (15 to 55)/(3 to 25)/(20 to 80), more preferably (20 to 45)/(5 to 20)/(30 to 70), still more preferably (25 to 40)/(8 to 18)/(40 to 60), and yet still more preferably (30 to 35)/(10 to 15)/(50 to 55).

For example, in the case of blending lithium sulfide, diphosphorus pentasulfide, and a lithium halide in the complexing step, a molar ratio of these raw materials {$Li_2S$/$P_2S_5$/(lithium halide)} is preferably (15 to 75)/(3 to 25)/(10 to 70), more preferably (25 to 65)/(5 to 20)/(20 to 60), still more preferably (35 to 55)/(8 to 18)/(30 to 50), and yet still more preferably (45 to 50)/(10 to 15)/(35 to 45).

In the case where lithium chloride and lithium bromide are jointly used as the lithium halide, a proportion of a molar number of lithium bromide relative to a total molar number of lithium chloride and lithium bromide is preferably 1 to 70%, more preferably 10 to 60%, still more preferably 20 to 50%, and yet still more preferably 30 to 40%.

(Pulverization Step)

It is preferred that the mixing step in the production method of the present embodiment includes a pulverization step of pulverizing the product obtained in the aforementioned complexing step, namely the precursor containing a lithium element, a sulfur element, and a phosphorus element, preferably the $PS_4^{3-}$ structure-containing precursor ($PS_4^{3-}$ structure, etc.). When the pulverized material resulting from pulverization in the present pulverization step is heated in the later-mentioned heating step (crystallization step), the diffusion length among the respective elements in the particle is shortened, so that even if the heating temperature is made lower, the desired crystalline solid electrolyte is readily obtained (for that reason, the "heating step" may also be referred to as "crystallization step"). For that reason, in the production method of the present embodiment, in the aforementioned mixing step, subsequently to the complexing step, by performing pulverization in the present pulverization step and subsequently performing heating in the heating step (crystallization step), a solid electrolyte having a small particle diameter and also having a high ionic conductivity is efficiently obtained. In the present embodiment, though it is general that subsequently to the aforementioned complexing step, the pulverization step is performed, in view of the fact that the pulverization can be performed through the same treatment as in mechanical milling, it is possible to perform the complexing step and the pulverization step at the same time, namely to omit the present pulverization step though it would become necessary to adjust the treatment condition.

As mentioned above, in the $PS_4^{3-}$ structure-containing precursor ($PS_4^{3-}$ structure, etc.) which is obtained through the drying step and heating after the mixing step (complexing step) or the complexing step, $PS_4^{3-}$ structures, such as amorphous $Li_3PS_4$, crystalline $Li_3PS_4$ ($\beta$-$Li_3PS_4$), and a complex from which the aforementioned amorphous $Li_3PS_4$ and crystalline $Li_3PS_4$ are obtainable through decomplexation, are contained. Among these, when the crystalline $Li_3PS_4$ is provided for the pulverization step, it may become amorphous $Li_3PS_4$ through decrystallization, and therefore, in the case where the amorphous $Li_3PS_4$ is contained in the foregoing precursor, the amorphous $Li_3PS_4$ contained in the precursor is either one of a decrystallized material through heating of the complex or a decrystallized material through pulverization of the crystalline $Li_3PS_4$.

The method of pulverization in the pulverization step may be performed by a known method and is not particularly restricted. However, from the viewpoint of more efficiently performing the pulverization, it is preferred to perform the pulverization by means of mechanical milling. In addition, by adopting the mechanical milling, in the case of blending the halogen element-containing raw material after the complexing step, or in the case of blending the lithium sulfide-containing raw material in the pulverization step or before the pulverization step, the reaction of these raw materials is promoted, so that a solid electrolyte having a high ionic conductivity is readily obtained.

The mechanical milling means the treatment using a medium type pulverizer as exemplified as the method for synthesizing the precursor in the aforementioned mixing step. The medium type pulverizer is roughly classified into a vessel driving type pulverizer and a medium agitation type pulverizer, with a vessel driving type pulverizer, such as a ball mill and a bead mill, being preferred. As the ball mill and the bead mill, any of various types, such as a rotary type, a rolling type, a vibration type, and a planetary type, may be adopted.

In the present pulverization step, the treatment of pulverization can be performed in a liquid phase. By performing the pulverization in a liquid phase, the pulverization is occasionally promoted. Accordingly, in the production method of the present embodiment, the complexing agent and the solvent used in the aforementioned mixing step may be subjected to the pulverization step as they are without being removed, and after completion of the aforementioned mixing step, the complexing agent and the solvent are removed, and then, a solvent is newly added, whereby pulverization may be performed in a liquid phase.

As the solvent which is used in the present pulverization step, for example, those exemplified as the complexing agent and the solvent which may be used during synthesis of the precursor in the aforementioned complexing step can be used. As the solvent, an aromatic hydrocarbon solvent, an ether-based solvent, and a nitrile-based solvent are preferred; an aromatic hydrocarbon solvent and a nitrile-based solvent are more preferred; toluene, xylene, ethylbenzene, tert-butylbenzene, and isobutyronitrile are still more preferred; and toluene and isobutyronitrile are yet still more preferred.

In this case, the use amount of the solvent relative to the solid electrolyte raw material is the same as the use amount of the complexing agent in the aforementioned complexing step.

An average particle diameter ($D_{50}$) of the pulverized material pulverized as obtained in the present pulverization step is preferably 0.01 μm or more and 100 μm or less, more preferably 0.03 μm or more and 50 μm or less, still more preferably 0.05 μm or more and 10 μm or less, and yet still more preferably 0.1 μm or more and 3 μm or less. By allowing the average particle diameter of the pulverized material to fall within the aforementioned range, in heating in the heating step (crystallization step), the diffusion length among the respective elements in the particle is shortened, so that even if the heating temperature is made lower, the desired crystalline solid electrolyte is readily obtained. In addition, since the heating temperature can be made lower, the progress of particle growth is suppressed, and the particle diameter can be kept small. As a result the crystalline solid electrolyte having a small particle diameter can be efficiently obtained.

In the present embodiment, by adjusting the treatment condition of pulverization, the average particle diameter of the pulverized material to fall within the aforementioned range. For example, in the treatment of pulverization, in the case of adopting the mechanical milling treatment using a medium type pulverizer, it is possible to achieve the adjustment by the particle diameter, shape, and use amount of a zirconia ball, a zirconia bead, etc. used for the pulverizer as well as an operation condition (e.g., a rotation number) of the pulverizer, or the use amount of the solvent relative to the precursor, etc. in the case of performing the pulverization in a liquid phase.

[Heating Step (Crystallization Step)]

The production method of a crystalline solid electrolyte of the present embodiment includes a heating step (crystallization step) of heating the precursor containing a lithium element, a sulfur element, and a phosphorus element as obtained in the aforementioned mixing in a solvent using a pressure-resistant container or while refluxing. As mentioned previously, the precursor containing a lithium element, a sulfur element, and a phosphorus element is preferably the $PS_4^{3-}$ structure-containing precursor. In addition, as also mentioned previously, the precursor containing a lithium element, a sulfur element, and a phosphorus element is preferably the pulverized material through the aforementioned pulverization step.

In the production method of the present embodiment, after the heating step (crystallization step), the $PS_4^{3-}$ structure contained in the precursor containing a lithium element, a sulfur element, and a phosphorus element, preferably the $PS_4^{3-}$ structure-containing precursor ($PS_4^{3-}$ structure, etc.) is reacted with the halogen element-containing raw material, and as a result, the halogen element is taken in the $PS_4^{3-}$ structure and also crystallized, whereby the crystalline solid electrolyte containing a lithium element, a sulfur element, a phosphorus element, and a halogen element is obtained.

By heating the pulverized material obtained in the mixing step, preferably the pulverization step in the heating step (crystallization step), the diffusion length among the respective elements in the particle is shortened, so that even if the heating temperature is made lower, the desired crystalline solid electrolyte is readily obtained. For that reason, it may be said that the "heating step" may also be referred to as the "crystallization step". In the production method of the present embodiment, by adopting the heating step (crystallization step) of heating the solid electrolyte in a solvent to crystallize it using a pressure-resistant container or while refluxing, it becomes possible to promote the crystallization of the solid electrolyte and also to suppress the increase of the particle diameter.

On the other hand, in the present heating step (crystallization step), when the crystalline solid electrolyte having a desired crystal structure is produced and then pulverized as in the pulverization step, there is a case where destruction or the like of the foregoing crystal structure occurs, whereby the ionic conductivity is lowered. From such viewpoint, it is preferred that the production method of the present embodiment does not include a step of pulverization after the present heating step (crystallization step).

The method for heating the precursor obtained in the mixing step, preferably the pulverized material obtained in the pulverization step is not particularly limited so long as it is a method for performing the heating using a pressure-resistant container or while refluxing, and any method can be adopted. For example, among the methods described as the method for heating the precursor in the aforementioned mixing step, a method using a pressure-resistant container, such as an autoclave, an argon gas atmosphere furnace, a firing furnace, and a vacuum heating device capable of performing heating under a negative pressure (in vacuo), and industrially, a method using a lateral dryer, a lateral vibration fluid dryer, etc. can be adopted. Above all, an autoclave is preferred from the viewpoint of suppressing an increase of the particle diameter in the heating step (crystallization step). In addition, examples of the method for performing the heating while refluxing include methods for performing refluxing by adopting a device inclusive of from a small device, such as a Dimroth condenser and a Liebig condenser, to an industrial medium to large reflux condenser according to the scale.

A heating temperature in the heating step (crystallization step) may be appropriately adjusted according to the desired solid electrolyte, and for example, in the case of producing a solid electrolyte having an argyrodite type crystal structure, it is preferably 200° C. or higher and 425° C. or lower, more preferably 225° C. or higher and 340° C. or lower, still more preferably 275° C. or higher and 385° C. or lower, and yet still more preferably 325° C. or higher and 370° C. or lower. So far, in the case of producing a solid electrolyte having an argyrodite type structure, a high temperature as 550° C. or 600 to 800° C. has been required. However, so far as the production method of the present embodiment is concerned, it is possible to adopt a low temperature as mentioned above. From such viewpoint, the production method of the present embodiment is suitable for production of a solid electrolyte having an argyrodite type crystal structure.

A heating time in the heating step (crystallization step) may be appropriately adjusted according to the desired solid electrolyte, and for example, it is preferably 1 minute or more, more preferably 10 minutes or more, still more preferably 30 minutes or more, and yet still more preferably 1 hour or more. In addition, though an upper limit of the heating time is not particularly restricted, it is preferably 24 hours or less, more preferably 10 hours or less, still more preferably 5 hours or less, and still more preferably 3 hours or less.

The heating can be performed in an inert gas atmosphere (for example, a nitrogen atmosphere and an argon atmosphere) or in a reduced pressure atmosphere (especially, in vacuo). Deterioration (for example, oxidation) of the obtained solid electrolyte can be prevented from occurring.

As for the heating in the present heating step (crystallization step), it is not preferred to perform drying in advance, or to perform drying simultaneously with the crystallization. This is because when performing the drying, the average particle diameter occasionally become large, and in the production method of the present embodiment, it is preferred to not perform the drying as far as possible.

As for the heating in the present heating step (crystallization step), without removing the complexing agent and the solvent used in the aforementioned mixing step and pulverization step, the precursor accompanied with the complexing agent and the solvent as obtained in these steps may be heated as they are, or the complexing agent and the solvent accompanied with the precursor may be subjected to solvent displacement with a high-boiling point solvent in advance. In this case, as the solvent which may be used, those described for the solvent which may be used in the aforementioned mixing step can be used, a solvent having a higher boiling point than those of the complexing agent and the solvent used in the complexing step is preferably used. Above all, solvents which are generally dealt as a high-boiling point solvent, such as paraffin-based solvents, e.g., a normal paraffin-based solvent and an isoparaffin-based solvent, are preferably used. Similar to the complexing agent which is used in the aforementioned mixing step, as the solvent to be used during performing the heating step (crystallization step), those having such properties that they do not dissolve or hardly dissolve the precursor therein are preferably adopted. From such viewpoint, paraffin-based solvents are preferred. Impurities, such as the solvent, are hardly accompanied into the crystalline solid electrolyte obtained after the heating step (crystallization step), and a crystalline solid electrolyte having a high quality (high ionic conductivity) is readily obtained.

In the case of performing the solvent displacement, the aforementioned drying may be performed.

(Crystal Structure of Solid Electrolyte)

Examples of the solid electrolyte which is obtained by the production method of the present embodiment include argyrodite type crystal structure, such as $Li_6PS_5X$ and $Li_{7-x}PS_{6-x}X_x$ (X=Cl, Br, or I, and x=0.0 to 1.8) (see JP 2011-096630 A, JP 2013-211171 A, etc.). Diffraction peaks of such an argyrodite-based crystal structure appear, for example, in the vicinity of 2θ=15.3°, 17.7°, 31.1°, 44.9°, and 47.70.

The following are exemplified as the argyrodite-based crystal structure.

The crystal structure represented by a compositional formula $Li_{7-x}P_{1-y}Si_yS_6$ or $Li_{7+x}P_{1-y}Si_yS_6$ (x is −0.6 to 0.6, and y is 0.1 to 0.6), which has the aforementioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

The crystal structure represented by the aforementioned compositional formula $Li_{7-x2-y}PS_{6-x-y}Cl_x$ (0.8≤x≤1.7, and 0<y≤(−0.25x+0.5)) is preferably a cubic crystal, and in the X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

The crystal structure represented by the aforementioned compositional formula $Li_{7-x}PS_{6-x}Ha_x$ (Ha represents Cl or Br, and x is preferably 0.2 to 1.8) is preferably a cubic crystal, and in the X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

These peak positions may vary within a range of ±0.5°.

The crystal structure of the solid electrolyte obtained by the production method of the present embodiment is preferably an argyrodite type crystal structure from the standpoint of obtaining a higher ionic conductivity. In addition, the production method of the present embodiment is suitable for production of a solid electrolyte having an argyrodite type crystal structure from the viewpoint of an effect such that the heating temperature in the step 3 can be made lower.

The solid electrolyte obtained in the production method of the present embodiment may be one having the aforementioned argyrodite type crystal structure or may be one having the argyrodite type crystal structure as a main crystal. However, from the viewpoint of obtaining a higher ionic conductivity, one having the argyrodite type crystal structure as a main crystal is preferred. In this specification, the wording "having as a main structure" means that a proportion of the crystal structure as an object among crystal structures is 80% or more, and the foregoing proportion is preferably 90% or more, and more preferably 95% or more.

The crystalline solid electrolyte obtained by the production method of the present embodiment is preferably one not containing crystalline $Li_3PS_4$ (β-$Li_3PS_4$) from the viewpoint of obtaining a higher ionic conductivity. Whether or not the crystalline solid electrolyte is one not containing crystalline $Li_3PS_4$ (β-$Li_3PS_4$) can be confirmed by the presence or absence of diffraction peaks of 2θ=17.5° and 26.1° as seen in crystalline $Li_3PS_4$. In this specification, when the foregoing diffraction peaks do not appear, or even in the case where the foregoing diffraction peaks appear, so far as extremely small peaks as compared to the diffraction peaks of the argyrodite type crystal structure are detected, it is taken that the crystalline $Li_3PS_4$ (β-$Li_3PS_4$) is not contained.

Although the shape of the solid electrolyte which is obtained by the production method of the present embodiment is not particularly restricted, examples thereof include a granular state. The average particle diameter ($D_{50}$) of the granular solid electrolyte is preferably 0.01 µm or more and 100 µm or less, more preferably 0.03 µm or more and 50 µm or less, still more preferably 0.05 µm or more and 10 µm or less, and yet still more preferably 0.1 µm or more and 3 µm or less.

EXAMPLES

Next, the present invention is described specifically with reference to Examples, but it should be construed that the present invention is by no means restricted by these Examples.

Example 1

In an impeller-provided reaction tank, lithium sulfide and diphosphorus pentasulfide were weighed in a molar ratio of 75/25 and added in a nitrogen atmosphere. After actuating the impeller while cooling with methanol/liquefied nitrogen, dehydrated tetrahydrofuran (dehydrated THF) which had similarly been cooled to −20° C. with methanol/liquefied nitrogen in advance was added in a total amount of the raw materials of lithium sulfide and diphosphorus pentasulfide of 10% by mass by using a Teflon (registered trademark) tube, and then, the contents were agitated at room temperature (23° C.) for 72 hours. Subsequently, the tetrahydrofuran was removed using a cannula; subsequently, dehydrated THF was added in an amount such that the aforementioned total amount was 10% by mass; and an operation of agitation for 30 minutes and removal was repeated three times, to obtain a 3THF adduct (complex) of $Li_3PS_4$ having a $PS_4^{3-}$ structure.

Subsequently, the 3THF adduct (complex) of $Li_3PS_4$ having a $PS_4^{3-}$ structure was subjected to a reduced pressure drying treatment at 80° C. for 2 hours and then subjected to a heat treatment at 180° C. for 8 hours, to obtain crystalline $Li_3PS_4$ (β-$Li_3PS_4$) having a $PS_4^{3-}$ structure. As to the matter that the product is the crystalline $Li_3PS_4$ (β-$Li_3PS_4$), the powder X-ray diffractometry (XRD) was performed with an X-ray diffraction (XRD) apparatus (SmartLab apparatus, manufactured Rigaku Corporation), to confirm that the diffraction peaks appeared at 17.5° and 26.1°.

To the obtained crystalline $Li_3PS_4$ (β-$Li_3PS_4$) having a $PS_4^{3-}$ structure, $Li_2S$, LiCl, and LiBr were weighed in a ratio of 40, 100, and 60, respectively on the basis of the aforementioned molar ratio of lithium sulfide and diphosphorus pentasulfide of 75/25 and added; dehydrated toluene was added in an amount of 10% by mass in terms of a total amount of these; isobutyronitrile was further added; and the contents were subjected to a pulverization treatment for 1 hour by using a bead mill ("Labo Star Mini LMZ015 (model number)", manufactured by Ashizawa Finetech Ltd.), to obtain a slurry containing the vulcanized material of the precursor. In addition, in the present pulverization treatment, zirconia beads having a diameter of 0.5 mm were charged in an amount of 80% by volume in terms of the aforementioned total amount.

As a result of measuring the particle size distribution of the pulverized material after the pulverization treatment, the average particle diameter ($D_{50}$) was found to be 0.2 µm.

Subsequently, an isoparaffin-based solvent ("IP2830 (trade name)", manufactured by Idemitsu Kosan Co., Ltd.) was added to the pulverized material in a slurry state, and the contents were dried under reduced pressure at 100° C. for 6 hours, to undergo solvent displacement with a high-boiling point solvent (isoparaffin-based solvent); and the pulverized material was heated in the foregoing solvent at 340° C. for 2 hours by using an autoclave.

Thereafter, the solvent was removed using a cannula; dehydrated toluene was added and agitated, and decantation was performed to remove the high-boiling point solvent (isoparaffin-based solvent); and the resultant was further dried at 100° C. for 2 hours, to obtain a solid electrolyte having an argyrodite type crystal structure. As to the matter that the obtained solid electrolyte is one having an argyrodite type, the powder X-ray diffractometry (XRD) was performed to confirm that the diffraction peaks appeared at 15.3°, 17.7°, 31.1°, 44.9°, and 47.7°.

As a result of measuring the average particle diameter ($D_{50}$) of the obtained solid electrolyte, it was found to be 0.3 μm, and as a result of measuring the ionic conductivity, it was found to be 3.3 (mS/cm). Thus, it was confirmed that the obtained solid electrolyte had a small particle diameter and also had a high ionic conductivity.

In the present Example, the measurement of the ionic conductivity was performed in the following manner.

From the obtained crystalline solid electrolyte, a circular pellet having a diameter of 10 mm (cross-sectional area S: 0.785 cm$^2$) and a height (L) of 0.1 to 0.3 cm was molded to prepare a sample. From the top and the bottom of the sample, electrode terminals were taken, and the ionic conductivity was measured at 25° C. according to an alternate current impedance method (frequency range: 5 MHz to 0.5 Hz, amplitude: 10 mV) to give a Cole-Cole plot. In the vicinity of the right end of the arc observed in the high-frequency side region, a real number part Z' (Ω) at the point at which −Z" (Ω) is the smallest was referred to as a bulk resistance R (Ω) of the electrolyte, and according to the following equation, the ionic conductivity σ(S/cm) was calculated.

$R=\rho(L/S)$ $\sigma=1/\rho$

Figure 1:
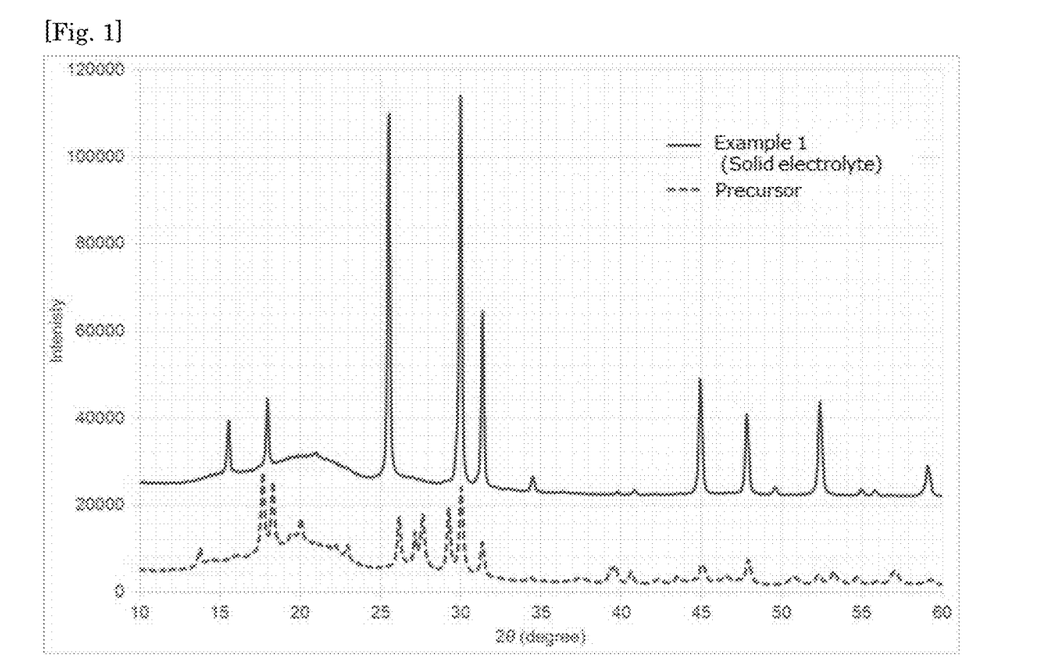
FIG. 1 is X-ray diffraction spectra of a precursor and a solid electrolyte obtained in Example 1.

The precursor and the solid electrolyte obtained in Example 1 were subjected to powder X-ray diffractometry (XRD). The X-ray diffraction spectra are shown in FIG. 1.

Comparative Example 1

The pulverized material in a slurry state obtained in Example 1 was dried under reduced pressure to remove the solvent, thereby obtaining a mixed powder. Thereafter, the obtained mixed powder was heated by an electric furnace ("F-1404-A (model number)", manufactured by Tokyo Garasu Kikai Co., Ltd.) within a glove box in a nitrogen atmosphere. Specifically, an Al$_2$O$_3$-made saggar ("999-60S (model number)", manufactured by Tokyo Garasu Kikai Co., Ltd.) was put in the electric furnace and kept at 340° C. for 1 hour or more. Thereafter, a door of the electric furnace was opened, 1 g of the mixed powder was quickly poured into the saggar, and then, the door was immediately closed, followed by heating for 10 minutes. Thereafter, the saggar was taken out from the electric furnace and gradually cooled, to obtain a solid electrolyte having an argyrodite type crystal structure.

Figure 2:
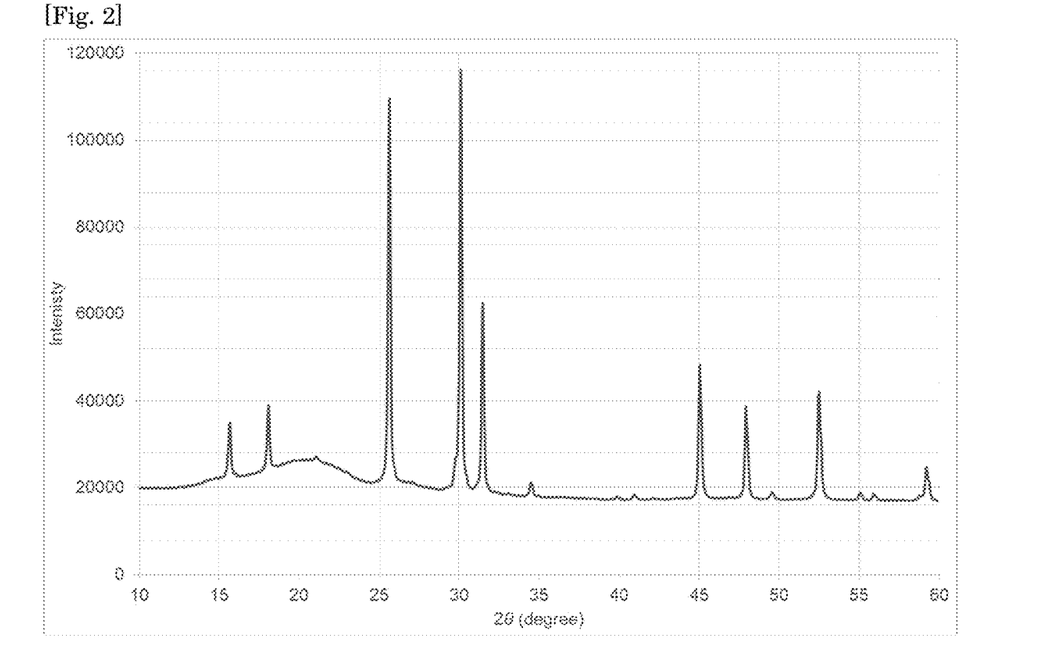
FIG. 2 is an X-ray diffraction spectrum of a solid electrolyte obtained in Comparative Example 1.

As a result of measuring the average particle diameter ($D_{50}$) of the obtained solid electrolyte, it was found to be 67 μm, and as a result of measuring the ionic conductivity, it was found to be 7.2 (mS/cm). It was confirmed that though the ionic conductivity was high, the average particle diameter was very large as compared to that of the Example, and the solid electrolyte was greatly granulated. In addition, the solid electrolyte obtained in Comparative Example 1 was subjected to powder X-ray diffractometry (XRD). The X-ray diffraction spectrum is shown in FIG. 2.

Comparative Example 2

Lithium sulfide, diphosphorus pentasulfide, lithium chloride, and lithium bromide were weighed in a total amount of 100 g so as to regulate the composition as in Example 1. Dehydrated toluene was added in an amount of 10% by mass in terms of a total amount of these; isobutyronitrile was further added; and the contents were subjected to a pulverization treatment for 1 hour by using a bead mill ("Labo Star Mini LMZ015 (model number)", manufactured by Ashizawa Finetech Ltd.), to obtain a slurry containing the vulcanized material. In addition, in the present pulverization treatment, zirconia beads having a diameter of 0.5 mm were charged in an amount of 80% by volume in terms of the aforementioned total amount.

The obtained slurry was dried under reduced pressure to remove the solvent, thereby obtaining a pulverized raw material mixed powder. Thereafter, the pulverized raw material mixed powder was fired at 400° C. for 1 hour in an electric furnace within a glove box in a nitrogen atmosphere. Specifically, 30 g of the pulverized mixed raw material was weighed in the Al$_2$O$_3$-made saggar used in Comparative Example 1, put into the electric furnace, subjected to temperature rise from room temperature to 400° C. for a time of 1.5 hours, and then kept at 400° C. for 1 hour, and the resultant was allowed to stand for natural cooling and then taken out to obtain a fired powder. The present step was repeated to obtain 100 g of the fired powder.

To 100 g of the aforementioned fired powder, dehydrated toluene was added in an amount of 10% by mass; isobutyronitrile was further added; and the contents was subjected to a pulverization treatment for 1 hour by using a bead mill ("Labo Star Mini LMZ015 (model number)", manufactured by Ashizawa Finetech Ltd.), to obtain a slurry containing the vulcanized material. In addition, in the present pulverization treatment, zirconia beads having a diameter of 0.5 mm were charged in an amount of 80% by volume in terms of the aforementioned total amount. The obtained slurry was dried under reduced pressure at 100° C., to obtain a solid electrolyte.

Figure 3:
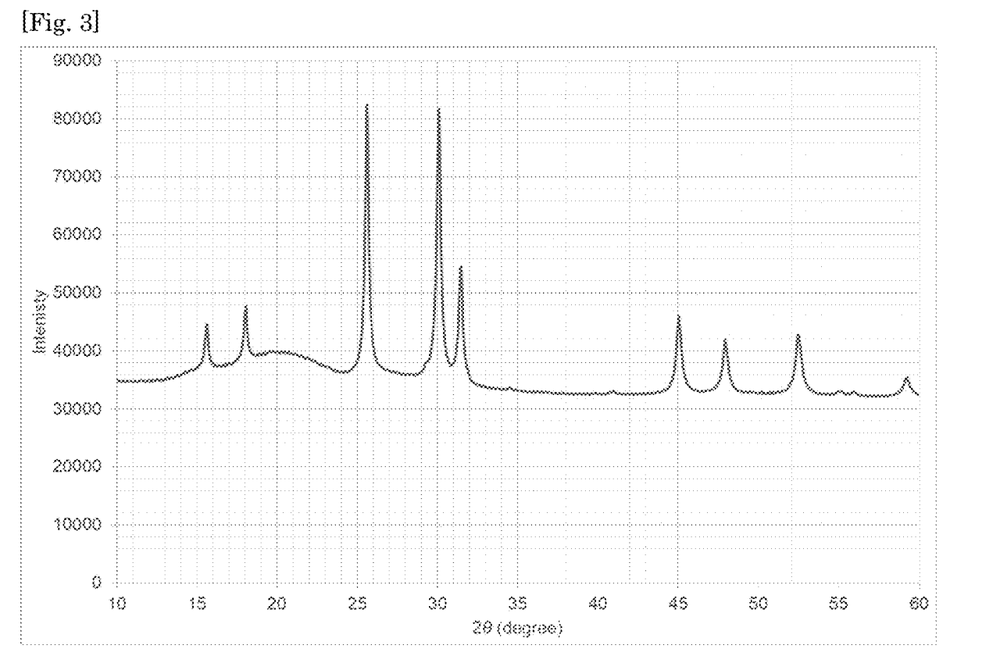
FIG. 3 is an X-ray diffraction spectrum of a solid electrolyte obtained in Comparative Example 2.

As a result of measuring the average particle diameter ($D_{50}$) of the obtained solid electrolyte, it was found to be 0.5 μm, and as a result of measuring the ionic conductivity, it was found to be 1.0 (mS/cm). It was confirmed that though the pulverization could be achieved, the ionic conductivity was low. In addition, the solid electrolyte obtained in Comparative Example 2 was subjected to powder X-ray diffractometry (XRD). The X-ray diffraction spectrum is shown in FIG. 3.

Reference Example 1

In an impeller-provided reaction tank, lithium sulfide and diphosphorus pentasulfide were weighed in a molar ratio of 75/25 and added in a nitrogen atmosphere. Furthermore, lithium sulfide, lithium chloride, and lithium bromide were weighed in a ratio of 40, 100, and 60, respectively on the basis of the aforementioned molar ratio of lithium sulfide and diphosphorus pentasulfide of 75/25 and added. After actuating the impeller while cooling with methanol/liquefied nitrogen, dehydrated tetrahydrofuran (dehydrated THF) which had similarly been cooled to −20° C. with methanol/liquefied nitrogen in advance was added in a total amount of the raw materials of liquid sulfide, diphosphorus pentasulfide, lithium chloride, and lithium bromide of 10% by mass by using a Teflon (registered trademark) tube, and then, the contents were agitated at room temperature (23° C.) for 72 hours. Subsequently, the tetrahydrofuran was removed using a cannula; subsequently, dehydrated THF was added in an amount such that the aforementioned total amount was 10% by mass; and an operation of agitation for 30 minutes and removal was repeated three times.

Figure 4:
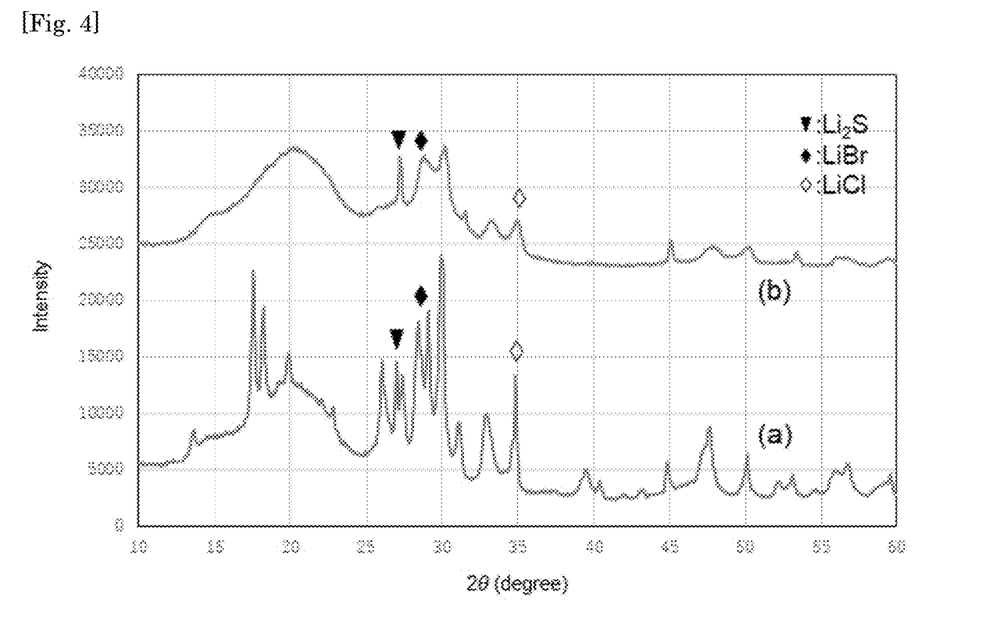
FIG. 4 is X-ray diffraction spectra of a precursor and a pulverized material obtained in Reference Example 1.

Subsequently, the resultant was subjected to a reduced pressure drying treatment at 80° C. for 2 hours and then subjected to a heat treatment at 180° C. for 8 hours, to obtain a precursor. As to the obtained precursor, the powder X-ray diffractometry (XRD) was performed in the same manner as in Example 1. As a result, as shown in (a) in FIG. 4, in addition to lithium sulfide, lithium bromide, and lithium chloride, crystalline $Li_3PS_4$ ($\beta$-$Li_3PS_4$) was confirmed.

Furthermore, dehydrated toluene was added such that the amount of the precursor was 10% by mass; isobutyronitrile was further added; and the contents were subjected to a pulverization treatment for 1 hour by using a bead mill ("Labo Star Mini LMZ015 (model number)", manufactured by Ashizawa Finetech Ltd.), to obtain a slurry containing the vulcanized material. In addition, in the present pulverization treatment, zirconia beads having a diameter of 0.5 mm were charged in an amount of 80% by volume in terms of the aforementioned total amount.

The slurry containing the pulverized material after the pulverization treatment was dried under reduced pressure at 100° C., to obtain a powder of the pulverized material. As to the obtained powder of the pulverized material, the powder X-ray diffractometry (XRD) was performed in the same manner as in Example 1. As a result, as shown in (b) in FIG. 4, in addition to lithium sulfide, lithium bromide, and lithium chloride, a broad peak appeared, and it was confirmed that the crystalline $Li_3PS_4$ ($\beta$-$Li_3PS_4$) became amorphous $Li_3PS_4$.

Reference Example 2

A slurry containing the pulverized material was obtained in the same manner as in Example 1. The obtained slurry containing the pulverized material was dried under reduced pressure at 100° C., to obtain a powder of the pulverized material.

Figure 5:
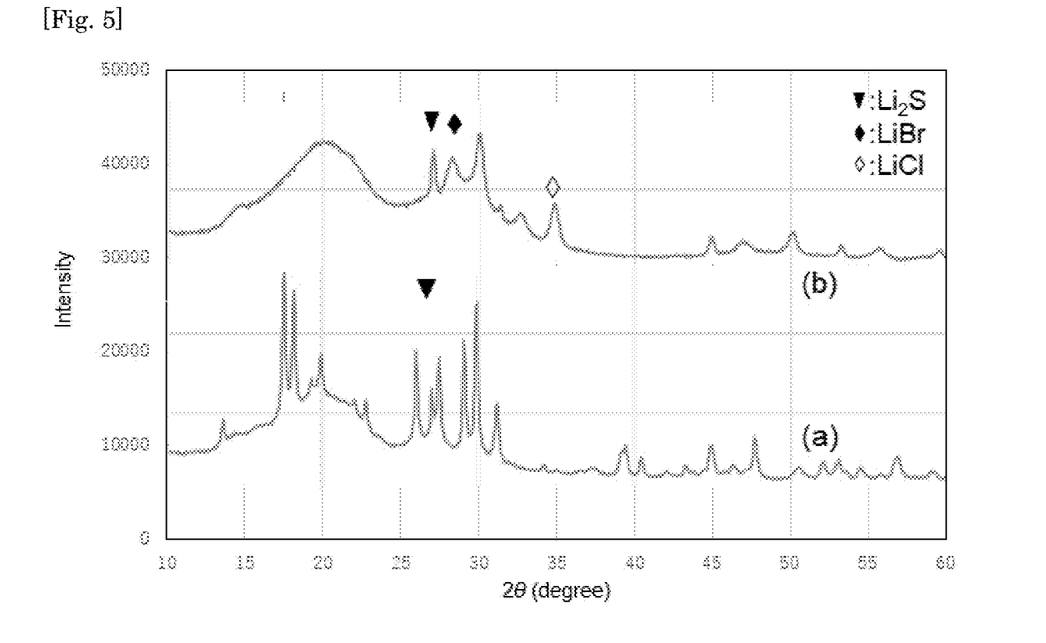
FIG. 5 is X-ray diffraction spectra of a precursor and a pulverized material obtained in Reference Example 2.

As to the obtained precursor of the pulverized material, the powder X-ray diffractometry (XRD) was performed in the same manner as in Example 1. As a result, as shown in (a) of FIG. 5, in addition to a small amount of unreacted lithium sulfide, crystalline $Li_3PS_4$ ($\beta$-$Li_3PS_4$) was confirmed. In addition, as to the powder of the pulverized material obtained by adding lithium sulfide, lithium chloride, and lithium bromide, the powder X-ray diffractometry (XRD) was performed in the same manner as mentioned above. As a result, as shown in (b) of FIG. 5, in addition to lithium sulfide, lithium bromide, and lithium chloride, a broad peak appeared, and it was confirmed that the crystalline $Li_3PS_4$ ($\beta$-$Li_3PS_4$) became amorphous $Li_3PS_4$. In the light of the above, from Reference Example 1 and Reference Example 2, it is noted that a similar precursor is obtained at the stage after the pulverization step and before the crystallization step, regardless of the blending of the halogen element-containing raw materials before and after the complexing step.

INDUSTRIAL APPLICABILITY

In accordance with the production method of a crystalline solid electrolyte of the present embodiment, it is possible to produce a solid electrolyte having a small particle diameter and also having a high ionic conductivity, and in particular, the foregoing production method is suitably adopted for production of a solid electrolyte having an argyrodite type crystal structure.

In addition, the solid electrolyte obtained by the production method of the present embodiment is suitably used for batteries, especially batteries to be used for information-related instruments, communication instruments, and so on, such as personal computers, video cameras, and mobile phones.

The invention claimed is:

1. A method for producing a crystalline solid electrolyte containing a lithium element, a sulfur element, a phosphorus element, and a halogen element, comprising:
    (i) a complexing step comprising mixing a solid electrolyte raw material and a complexing agent in a liquid phase, to obtain a precursor containing a lithium element, a sulfur element, and a phosphorus element; and
    (ii) a crystallization step comprising heating the precursor at a temperature of 325° C. or higher in a solvent using a pressure-resistant container or while refluxing.
    wherein (a) the solid electrolyte raw material in (i) comprises a halogen element-containing raw material, or
    (b) the precursor is mixed with a halogen element-containing raw material after (i) and before (ii).

2. The method for producing a crystalline solid electrolyte according to claim 1, wherein the complexing step further comprises pulverizing the precursor.

3. The method for producing a crystalline solid electrolyte according to claim 1, wherein in the complexing step, a complex containing a lithium element, a sulfur element, a phosphorus element, and the complexing agent is obtained.

4. The method for producing a crystalline solid electrolyte according to claim 1, wherein (b) the precursor is mixed with a halogen element-containing raw material after (i) and before (ii).

5. The method for producing a crystalline solid electrolyte according to claim 1, wherein the precursor contains a $PS_4^{3-}$ structure.

6. The method for producing a crystalline solid electrolyte according to claim 5, wherein the $PS_4^{3-}$ structure is amorphous $Li_3PS_4$, crystalline $Li_3PS_4$, or a complex from which the amorphous $Li_3PS_4$ or crystalline $Li_3PS_4$ is obtainable through decomplexation.

7. The method for producing a crystalline solid electrolyte according to claim 6, further comprising, after the complexing step;
    a drying step of obtaining a complex crystal,
    a decomplexing step of removing the complexing agent contained in the complex crystal to obtain the amorphous $Li_3PS_4$, and/or
    a step of heating at least one of the complex crystal and amorphous $Li_3PS_4$ to obtain crystalline $Li_3PS_4$.

8. The method for producing a crystalline solid electrolyte according to claim 1, wherein the precursor is heated at a temperature of 325° C. or higher and 425° C. or lower.

9. The method for producing a crystalline solid electrolyte according to claim 1, wherein the crystallization step is performed with an autoclave.

10. The method for producing a crystalline solid electrolyte according to claim 1, wherein after the crystallization step, a pulverization step is not included.

11. The method for producing a crystalline solid electrolyte according to claim 1, wherein before the crystallization step, a drying step is not included.

12. The method for producing a crystalline solid electrolyte according to claim 1, wherein the complexing agent is at least one solvent selected from the group consisting of an amine-based solvent, an ether-based solvent, and a nitrile-based solvent.

13. The method for producing a crystalline solid electrolyte according to claim 1, wherein the solid electrolyte is one having an argyrodite type crystal structure.

14. A method for producing a crystalline solid electrolyte containing a lithium element, a sulfur element, a phosphorus element, and a halogen element, comprising:
(i) a complexing step comprising mixing a solid electrolyte raw material and a complexing agent in a liquid phase to obtain a precursor containing a lithium element, a sulfur element, and a phosphorus element: and
(ii) a crystallization step comprising heating the precursor in a solvent using a pressure-resistant container or while refluxing, wherein the solvent is a paraffin-based solvent.

15. A method for producing a crystalline solid electrolyte containing a lithium element, a sulfur element, a phosphorus element, and a halogen element, comprising:
(i) a complexing step comprising mixing a solid electrolyte raw material and a complexing agent in a liquid phase to obtain a precursor containing a lithium element, a sulfur element, and a phosphorus element; and
(ii) a crystallization step comprising heating the precursor in a solvent using a pressure-resistant container or while refluxing, wherein the solvent is added after the complexing step,
wherein (a) the solid electrolyte raw material in (1) comprises a halogen element-containing raw material, or (b) the precursor is mixed with a halogen element-containing raw material after (1) and before (ii).

16. The method for producing a crystalline solid electrolyte according to claim 15, wherein the solvent that is added after the complexing step is added to the precursor, and is different from any solvents present in the liquid phase during the complexing step.

17. The method for producing a crystalline solid electrolyte according to claim 15, wherein (b) the precursor is mixed with a halogen element-containing raw material after (i) and before (ii).

18. The method for producing a crystalline solid electrolyte according to claim 15, wherein after the crystallization step, a pulverization step is not included.

19. The method for producing a crystalline solid electrolyte according to claim 15, wherein before the crystallization step, a drying step is not included.

20. The method for producing a crystalline solid electrolyte according to claim 15, wherein the solid electrolyte is one having an argyrodite type crystal structure.

* * * * *